UNITED STATES PATENT OFFICE.

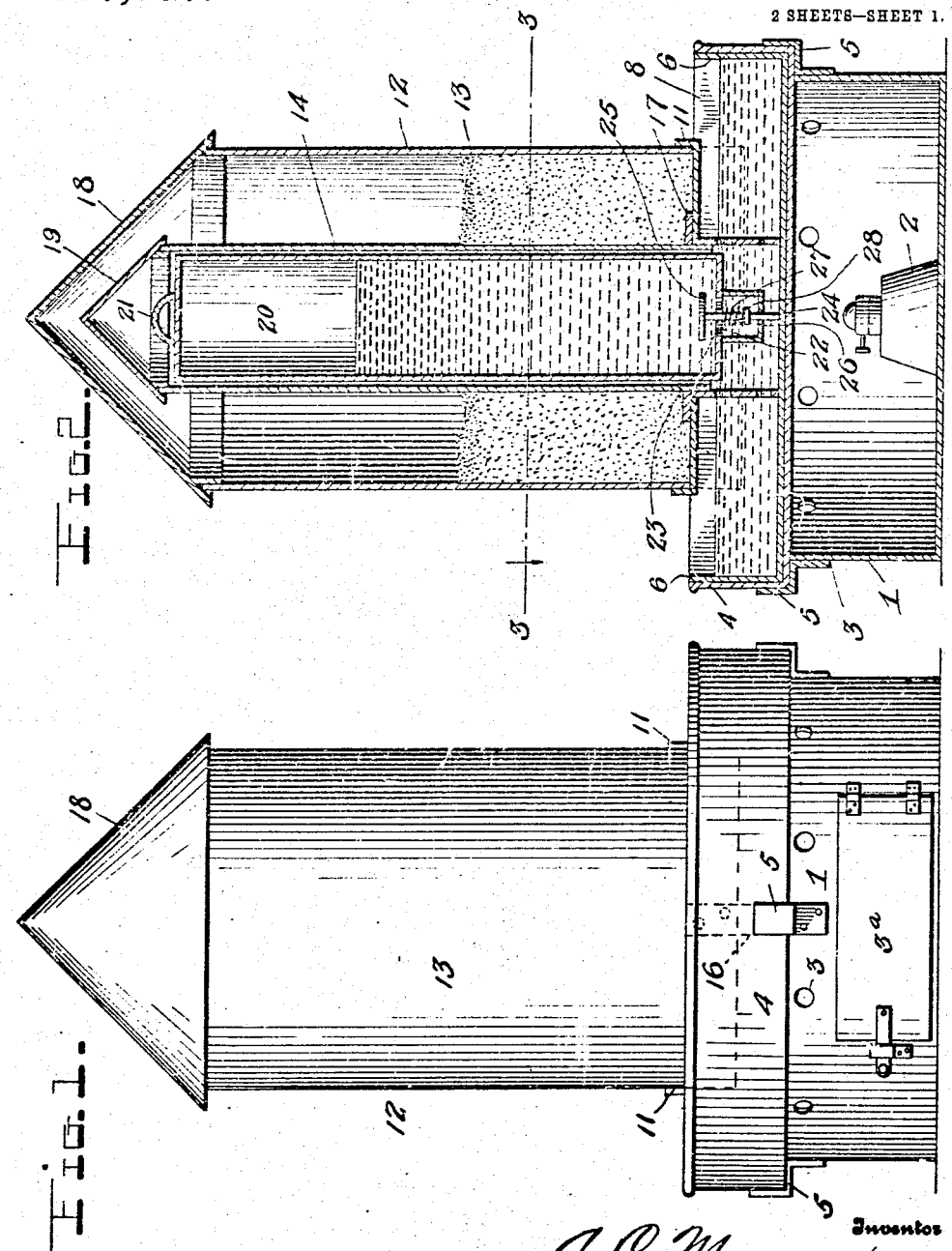

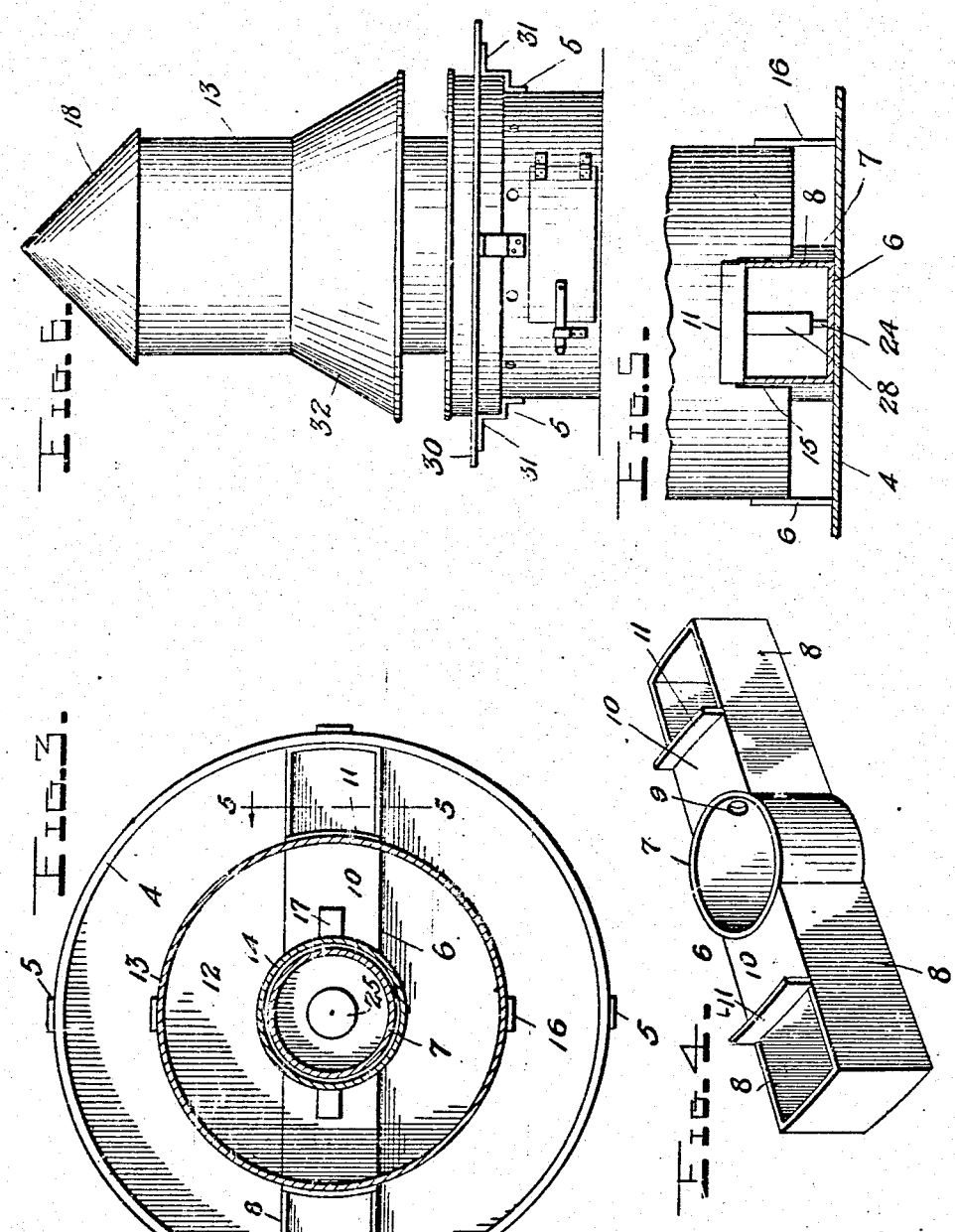

ALFRED CHARLES MARSOM, OF GROSSE POINTE FARMS, MICHIGAN.

FEEDING AND WATERING DEVICE.

937,947.  Specification of Letters Patent.  Patented Oct. 26, 1909.

Application filed October 24, 1908. Serial No. 459,415.

*To all whom it may concern:*

Be it known that I, ALFRED CHARLES MARSOM, a citizen of the United States, residing at Grosse Pointe Farms, in the county of Wayne and State of Michigan, have invented certain new and useful Improvements in Feeding and Watering Devices, of which the following is a specification, reference being had to the accompanying drawings.

This invention relates to improvements in devices for feeding and watering poultry or the like.

The object of the invention is to provide a simple and practical device of this character which will warm the food and water and supply the same automatically for consumption as fast as it is consumed by the fowls, thereby preventing waste and dispensing with the frequent replenishing of food and water receptacles.

With the above and other objects in view, the invention consists of the novel features of construction and the combination and arrangement of parts hereinafter fully described and claimed, and illustrated in the accompanying drawings, in which—

Figure 1 is a side elevation of the improved poultry feeder and waterer; Fig. 2 is a vertical sectional view through the same taken through the water pan or trough; Fig. 3 is a horizontal section taken on the plane indicated by the line 3—3 in Fig. 2; Fig. 4 is a perspective view of the water pan or trough; Fig. 5 is a detail vertical section, the plane of which is indicated by the line 5—5 in Fig. 3; Fig. 6 is a side elevation of a modified form of the invention which is especially adapted for feeding pigeons and the like.

The invention comprises a base 1 preferably in the form of a cylindrical pan adapted to contain a removable lamp 2 or an equivalent heater and having suitable air inlet and outlet openings 3. In one side of the base pan is a suitable opening to permit of access to the lamp, said opening being closed by a suitable door 3ª shown in Fig. 1. Removably arranged upon the upper edge of the side wall of the base is a feed pan 4 preferably of cylindrical shape and of greater diameter than that of the base pan 1. Angular brackets 5 secured to the base pan at intervals around its top are adapted to engage the side wall of the feed pan to retain the latter upon said base pan.

6 denotes a water pan or trough removably arranged in the feed pan and extending transversely across the same. Said water pan comprises a central cylindrical section 7 disposed in an upright position and having two substantially rectangular end sections 8 projecting in opposite directions from its sides and in communication with the same through openings 9. The end sections 8 of the pan have the outer portions of their top open to expose the water in the pan and permit the fowls to have access thereto, but the inner portion of the top of said sections is closed by a plate 10, which latter has at its outer edge an upstanding stop flange 11, the purpose of which will be presently explained.

12 denotes a feed receptacle preferably of cylindrical shape and consisting of separable outer and inner cylindrical walls 13, 14. The outer wall or cylinder 13 has its upper and lower ends open and its lower end is formed at diametrically opposite points with notches or recesses 15 adapted to receive the end sections 8 of the water pan and said outer wall is placed in position upon the top of said pan. The notched or recessed portion of said wall 13 is adapted to fit against the stop flanges 11, as shown in Figs. 2 and 3, so that said flanges will prevent the wall from shifting longitudinally upon the water pan, transverse shifting and tilting movement of said wall being prevented by reason of the engagement of the notches 15 with the water pan and also by securing to the wall 13 at diametrically opposite points depending feet or legs 16 which are adapted to rest upon the bottom of the feed pan 4. The top plates 10 upon the end sections of the water pan are adapted to close the portions of the feed receptacle immediately above the water pan so that the feed in said receptacle cannot enter the water pan, but the remaining portions of the bottom of the feed receptacle are open to permit the feed in it to feed by gravity into the pan 4 on opposite sides of the water pan. Owing to this construction, it will be noted that the feed pan 4 will be filled from the feed receptacle 12 as fast as the fowls consume the feed. The inner wall 14 of the feed receptacle may be rigidly connected to the outer wall 13, if desired, but as illustrated it is in the form of a separate cylinder adapted to have its lower end project into the cylindrical central portion 1 of the water pan. It is retained in such position by means of a flange 17 provided upon its exterior adjacent to its bottom and adapted to rest upon the top of the water pan. The open top of the outer wall or cylinder 13 is closed by a removable cover 18 which is preferably cone-shaped, and a similar removable cover 19 is also preferably provided for the inner wall or cylinder 14.

20 denotes a water reservoir preferably of cylindrical form provided with a closed top having a finger or hand loop 21. In the flat bottom of the reservoir 20 are openings 22 arranged around a central opening 23 for the reception of the stem 24 of a valve 25. The latter is in the form of a disk arranged upon the inner end of the stem 24 and adapted to close the openings 22. The outer end of the stem 24 is adapted to slide in a U-shaped guide bracket 26 secured to the bottom of the reservoir and surrounding said stem is a coil spring 27 for actuating the valve stem to maintain the valve normally in its closed position. Said coil spring is confined between the bottom of the reservoir and a stop collar 28 secured upon the valve stem.

The operation of the invention is as follows: The lamp or heater 2 is lighted and placed upon the center of the bottom of the base pan 1, the feed pan 4 is then placed in position upon the top of the base pan and between the retaining brackets 5. The water pan 6 is then placed in position in the feed pan and the outer and inner walls 13, 14 of the feed receptacle are then placed in position upon the water pan, as clearly shown in the drawings. Feed of any description may be then placed in the receptacle 12 and owing to the open bottom of said receptacle it will fill the feed pan 4 on opposite sides of the water pan. The water reservoir 20 is then filled with water by inverting the same and depressing the valve stem to open the valve so that water may be introduced through the valve openings 22. When said stem is released the spring will actuate the valve to its closed position so that when the reservoir is righted no water will escape. The reservoir is then lowered into the inner wall or cylinder 14 until the valve stem engages the bottom of the water pan and is actuated upwardly to open the valve 25. When the latter opens the water in the reservoir will pass out of the same and into the water pan 6 until the level of the water in the latter reaches the plane of the bottom of the reservoir, and it will be seen that this level will be automatically retained as long as there is water in the reservoir. The covers 19, 18 may then be placed upon the walls 14, 13.

From the foregoing it will be seen that the heat of the lamp 2 will warm both the water and the feed so that during cold weather there will be no danger of the water freezing and both food and water of the proper temperature will be within reach of the fowls at all times. Owing to the peculiar construction of the parts of the device fresh, clean food and water will be supplied to the fowls as fast as they consume it and it will be impossible for them to waste it. The device is simple in construction and may therefore be produced at a small cost and will be durable in use. Furthermore, it is exceedingly easy to supply with water and feed and requires very little attention on the part of the person in charge of the poultry.

In Fig. 6 of the drawings is shown a feeding and watering device especially adapted for the use of pigeons and the like. It is similar in all respects to the device above described with the exception that an annular platform 30 surrounds the feed pan and is secured to and supported by extensions 31 on the upper ends of the brackets 5. A cone-shaped hood 32 is also provided upon the outer wall 13 of the feed receptacle so as to overhang the feed pan 4 and prevent pigeons from getting into said pan.

Having thus described the invention what is claimed is:

1. A device of the character described comprising a circular feed pan, a removable rectangular water pan arranged transversely therein, said water pan having an upright cylindrical section at its center with oppositely extending end sections, the latter being in communication with the central section through openings formed in the wall of the latter, said end sections of the water pan having the inner portions of their tops closed by horizontal plates, the latter having upstanding stop flanges at their outer ends, a feed receptacle removably arranged on the pan and consisting of outer and inner cylindrical walls, the outer wall having its bottom edge notched at opposite points to receive the water pan, whereby said outer wall will be prevented from turning, the plates upon the inner portions of the end sections of the water pan being adapted to close portions of the open body of the feed receptacle and the outer wall of the latter being adapted to engage said stop flanges to prevent lateral displacement of the outer wall, supporting feet depending from opposite points of the bottom edge of the outer wall of the feed receptacle and adapted to engage the bottom of the feed pan on opposite sides of the water pan, whereby the feed receptacle will be prevented from tilting, and a water reservoir removably arranged within the inner wall of the feed receptacle and adapted to enter the cylindrical section of the water pan.

2. A device of the character described comprising a base pan to contain a heater, angle brackets at the top of the base pan, a feed pan removably arranged on the open top of the base pan and retained thereon by said brackets, a removable water pan extending transversely in the feed pan and having a cylindrical central section and end sections in communication with the central section through openings in the wall of the central section, plates secured to the top of the inner portions of the end sections of the water pan to close said portions, upstanding stop flanges on the outer ends of said plates, a feed receptacle having inner and outer cylindrical walls, the inner wall being adapted to enter the central section of the water pan and the outer wall having its bottom edge notched at opposite points to straddle the water pan, said outer wall being also adapted to engage said stop flanges, supporting feet depending from opposite points of the outer wall of the feed receptacle and adapted to rest upon the bottom of the feed pan, a water reservoir removably arranged in the inner wall of the feed receptacle, a valve device for said water reservoir, a removable cap upon the inner wall of the feed receptacle, and a removable cap upon the outer wall of the feed receptacle.

In testimony whereof I hereunto affix my signature in the presence of two witnesses.

ALFRED CHARLES MARSOM.

Witnesses:
L. S. TROWBRIDGE, Jr.,
CASSIE L. WESLEY.